Patented Feb. 6, 1934

1,945,914

UNITED STATES PATENT OFFICE 1,945,914

PRODUCTION OF WATER-SOLUBLE PHOSPHATE COMPOUNDS

Emil Reubke, Bitterfeld, Germany, assignor to I. G. Farbenindustrie Aktiengesellschaft, Frankfort-on-the-Main, Germany No Drawing. Application July 1, 1931, Serial No. 548,268, and in Germany July 19, 1930

5 Claims. (Cl. 23—107)

The present invention relates to the treatment of water-insoluble phosphates and is more particularly concerned with improvements in a process of converting water-insoluble calcium phosphates and especially raw phosphates into water-soluble phosphate compounds, such as are frequently employed as fertilizers.

The production of fertilizers containing phosphoric acid and nitrogen usually starts by first treating raw phosphates so as to obtain phosphoric acid and subsequently neutralizing said acid with nitrogen compounds to the desired degree. The production of phosphoric acid by the so-called volatilization process, however, involves a large power consumption and complicated apparatus, and has the disadvantage that huge quantities of slag are obtained as a waste product whose utilization or removal necessitates heavy expenses.

Another known method of producing phosphoric acid from raw phosphates consists in treating the latter with other acids, such as sulphuric, nitric or hydrochloric acid. The main draw-back of these methods resides in that either the phosphoric acid is difficult to separate from the salt solutions formed, or in that the other acids in the course of the process are converted into more or less insoluble calcium compounds from which it is generally extremely cumbersome, if not impossible, to recover the free acid for repeated application.

The realization of the drawbacks of these known methods has thus led to contemplate a treatment of the raw phosphates with acid or neutral ammonium salts of such acids, and particularly with acid or neutral ammonium sulfate; in the latter case, mixtures of raw phosphate and neutral ammonium sulfate are employed, the acid ammonium sulfate which is formed by thermic dissociation, effecting the conversion; dissociation may be facilitated by the presence of an indifferent gas, such as superheated steam. It has transpired from my experiments, however, that under the conditions then prevailing, dissociation of the neutral salt to a sufficient extent does not take place until temperatures are reached at which the liberated ammonia already decomposes to a large extent and thus is lost in the subsequent process whereas simultaneously a substantial percentage of the phosphoric acid is converted into pyro- or meta-phosphoric acid, which both display no fertilizing properties.

Further attempts have been made to treat raw phosphates with a solution of acid sulfate of ammonia, said solution being obtained in a separate process stage, either by thermically decomposing crystallized ammonium sulfate, or by electrolytically decomposing a solution containing ammonium sulfate. The former method involves heavy losses of ammonia for the reasons above described. Moreover, in both cases the separate preparation of a solution of acid sulfate of ammonia is cumbersome and expensive.

Finally, it has been proposed to treat mixtures of mono- and di-calcium phosphate with ammonium sulfate at temperatures not exceeding 80° C. so as to obtain mixtures of mono- and di-ammonium phosphate. Experiments, however, have shown that only the mono-calcium phosphate is converted whereas the di-calcium phosphate remains unchanged because its solubility is substantially lower than that of the calcium sulfate formed in the course of reaction.

I have now ascertained that it is possible to produce the acid ammonium salt required for converting the water-insoluble phosphates into a water-soluble form, from a solution of a neutral ammonium salt coincidentally with the treatment of the phosphates, that is to say without its involving a separate process step. According to the invention this is effected by treating the water-insoluble phosphates with a neutral ammonium salt solution under external conditions which lead to a hydrolytic (as distinguished from a thermal) dissociation of the ammonium salts, and continuously separating the dissociated ammonia from the reaction mixture. The acid formed in the solution by the hydrolytic dissociation dissolves the phosphate and is thus consumed, this causing progressive hydrolyzation with continuous dissociation of ammonia so as to maintain the equilibrium of hydrolyzation, the latter being characterized by the presence of free acid. Thus, free acid is continuously re-produced in the solution in the same measure in which the free acid already present is consumed by reaction with the phosphate, and it is thus possible, by maintaining suitable conditions of dissociation, to convert any given quantity of water-insoluble phosphates into the water-soluble form provided sufficient quantities of neutral ammonia salt solution are applied.

The treatment is preferably carried out at temperatures between about 200 and 300° C., with the application of pressure, and the separation of the ammonia formed in the solution owing to dissociation is facilitated and accelerated by passing an inert gas, such as steam, through the solution. It is surprising that the acid concentration attainable under these circumstances is not only sufficient to convert di-calcium phosphate into a water-soluble compound, but even to convert mineral raw phosphates, particularly tri-calcium phosphate into water-soluble compounds.

The velocity of the reaction, for a given temperature, depends on the acid concentration in the state of equilibrium. Since hydrolysis increases considerably with a rise in temperature, it is advantageous to carry out the reaction at temperatures above normal boiling temperature of the solution, and with the application of pressure.

By selecting suitable ammonium salts, the lime dissolved in the process may be precipitated in insoluble form. In this manner solutions containing only ammonium compounds are directly obtained. By adjusting the concentration of the starting solutions it is possible to recover crystallized ammonium phosphate without concentrating the solutions obtained in the process simply by cooling.

When, for instance, raw phosphates are treated with a solution containing both ammonium sulfate and mono-ammonium phosphate, the lime of the raw phosphate is precipitated as calcium sulfate and it is possible to recover the ammonium sulfate employed in the process in an extremely simple and known manner, namely, by treating the calcium sulfate with ammonia and carbonic acid. Thus, the phosphoric acid contents of natural raw phosphates are converted into ammonium phosphates, that is to say, into a water-soluble form, by the application only of ammonia and carbonic acid.

The process as described is not limited to the conversion of tri-calcium phosphates into soluble ammonium phosphates, but may also be employed for converting tri-calcium phosphate into di-calcium phosphate, or to obtain solube ammonium phosphate from di-calcium phosphate produced in any other known manner.

*Example*

In an autoclave provided with an acid-proof lining, 44.5 kgs. of finely crushed and ground (80 percent passing through 10,000 mesh/sq. cm.) natural tri-calcium phosphate (48.2 percent CaO, 32.0 percent $P_2O_5$, 5.7 percent $SiO_2$, 6.4 percent moisture and loss by heating, balance $Fe_2O_3$, $Al_2O_3$, $CaF_2$ and similar impurities) are treated with a solution containing 25.0 kgs. of mono-ammonium phosphate $NH_4H_2PO_4$ and 100.5 kgs. of ammonium sulfate $(NH_4)_2SO_4$ in 250 litres of water, while stirring, at a temperature between 245° C. and 250° C. with a pressure of 35 to 38 atms. for about 20 hours. The hydrolysis taking place under these conditions with liberation of ammonia may be represented by the following equations:

I. $(NH_4)_2SO_4 + H_2O = (NH_4)HSO_4 + NH_3 + H_2O$, the acid sulfate of ammonia thus formed reacting with the phosphate according to II. $Ca_3(PO_4)_2 + 3NH_4HSO_4 =$
$3CaSO_4 + 2NH_4H_2PO_4 + NH_3$ with formation of mono-ammonium phosphate and further quantities of ammonia, since at the temperatures in question di-ammonium phosphate is unstable.

The liberated ammonia is, together with the steam, continuously removed from the autoclave by means of a valve and subsequently condensed in a suitable device. The quantity of ammonia distilled easily enables to ascertain the termination of the treatment, since the conversion of the phosphate takes place according to the reduced equation (I+II) $Ca_3(PO_4)_2 + 3(NH_4)_2SO_4 =$
$3CaSO_4 + 2(NH_4)H_2PO_4 + 4NH_3$ Thus, after distillation of 19 kgs. of ammonia (together with steam), the conversion is completed and the contents of the autoclave are separated by filtration, which yields 55.3 kgs. of calcium sulfate (39.0 percent CaO, 52.4 percent $SO_3$, 4.5 percent $SiO_2$, 2.7 percent $P_2O_5$) and a solution containing 52.0 kgs. of ammonium sulfate and 45.7 kgs. of mono-ammonium phosphate in 100 litres of water, this concentration being arrived at by correspondingly regulating the water or steam supply during the treatment. The solution obtained is, with respect to mono-ammonium phosphate, saturated at 55° C., and therefore on cooling to 20°C. yields 21.5 kgs. of substantially pure mono-ammonium phosphate in crystallized form (94 percent $NH_4H_2PO_4$, 4 percent $(NH_4)_2SO_4$, 1.5 percent $CaSO_4$).

Whereas the main part of the mono-ammonium phosphate formed may, by suitably adjusting the concentration of the solution, be obtained by a simple cooling process, more diluted solutions may be concentrated by evaporation so as to recover the mono-ammonium phosphate therein.

When it is desired to recover di-ammonium phosphate, it is merely necessary to combine the solution obtained after removal of the calcium sulfate with a corresponding quantity of the distilled ammonia.

The separated calcium sulfate is converted into ammonium sulfate, by means of ammonia and carbonic acid in the known manner, which ammonium sulfate, preferably after adding the mother liquor recovered from the crystallization of mono-ammonium phosphate, is employed in the next batch.

In the same manner it is also possible to convert di-calcium phosphate into mono-ammonium phosphate. For this purpose the di-calcium phosphate is heated in an autoclave together with an ammonium sulfate solution to temperatures between 200 and 300° C., the quantity of ammonia corresponding to the quantity of acid ammonium sulfate formed being distilled with steam. Conversion takes place according to the equation $CaHPO_4 + (NH_4)_2SO_4 = CaSO_4 + NH_4H_2PO_4 + NH_3$.

The resulting solution is separated from the calcium sulfate formed by filtration and mono-ammonium sulfate recovered therefrom by crystallization.

I claim:

1. A process of converting a water-insoluble calcium phosphate into water-soluble phosphate compounds which comprises treating the calcium phosphate, in the absence of free acids, with an aqueous solution of neutral ammonium sulfate and mono-ammonium phosphate at temperatures between about 200 and 300° C., and withdrawing the ammonia liberated by hydrolyzation from the reaction mixture.

2. A process of converting a water-insoluble calcium phosphate into water-soluble phosphate compounds, which comprises treating the calcium phosphate, in the absence of free acids with an aqueous solution of neutral ammonium sulfate at temperatures between about 200 and 300° C., then separating the solution containing the ammonia compounds from the calcium sulfate formed, converting such calcium sulfate into ammonium sulfate by means of ammonia and carbonic acid, and reutilizing the aqueous solution of ammonium sulfate thus obtained in the process.

3. A process of converting a water-insoluble calcium phosphate into water-soluble phosphate compounds, which comprises treating the calcium phosphate, in the absence of free acids, with an aqueous solution of neutral ammonium sulfate and mono-ammonium phosphate at temperatures between about 200 and 300° C., then separating the solution containing the ammonia compounds from the calcium sulfate formed, converting such calcium sulfate into ammonium sulfate by means of ammonia and carbonic acid, and reutilizing the aqueous solution of ammonium sulfate thus obtained in the process.

4. A process of converting a water-insoluble calcium phosphate into polybasic ammonium phosphate, which comprises treating the calcium phosphate, in the absence of free acids, with an aqueous solution of neutral ammonium sulfate under conditions which lead to hydrolyzation, withdrawing the ammonia liberated by hydrolyzation from the reaction mixture and reacting the mono-ammonium phosphate formed with such withdrawn ammonia.

5. A process of converting a water-insoluble calcium phosphate into water-soluble phosphate compounds, which comprises treating the calcium phosphate, in the absence of free acids, with an aqueous solution of neutral ammonium phosphate at temperatures between about 200 and 300° C. while passing steam through the reaction mixture, and withdrawing the ammonia liberated by hydrolyzation from the reaction mixture.

EMIL REUBKE.